2,806,853
Patented Sept. 17, 1957

2,806,853

CHEMICAL COMPOUNDS AND PROCESSES FOR PREPARING THE SAME

Robert L. Clark, Woodbridge, and Arsenio A. Pessolano, Colonia, N. J., assignors to Merck & Co., Inc., Rahway, N. J., a corporation of New Jersey No Drawing. Application July 31, 1956, Serial No. 601,102

2 Claims. (Cl. 260—307)

This invention relates to the chemical compound 6-carbamido-benzoxazolone represented by the following formula:

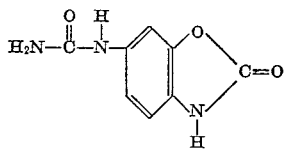

This new chemical compound, 6-carbamido-benzoxazolone, possesses marked and effective anticonvulsant properties and is non-toxic. One of the chief disadvantages encountered in the clinical use of some of the barbiturates presently administered in the treatment of convulsions such as epilepsy has been the occurrence of side effects of which hypnosis has been one of the most serious. The 6-carbamido-benzoxazolone compares favorably with the presently used anticonvulsant compositions insofar as their ability to protect against convulsions. In addition, 6-carbamido-benzoxazolone possesses the distinct advantage of being free of the strong hynotic effect associated with barbiturates.

The starting material utilized in the present invention, 6-aminobenzoxazolone, is represented by the structural formula:

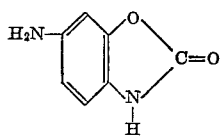

The above compound is treated with potassium cyanate to form 6-carbamido-benzoxazolone:

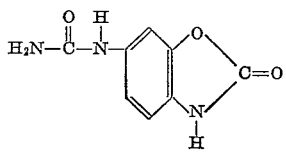

In accordance with one embodiment of this invention, to a solution of warm hydrochloric acid is added 6-aminobenzoxazolone, a suspension is formed and potassium cyanate in water is then added. There is complete solution and in a few seconds the precipitate of 6-carbamido-benzoxazolone separates from solution.

The 6-carbamido-benzoxazolone thus obtained is effective orally and therefore administered in the form of capsules or tablets. The capsules would contain about 0.25 gram to about 0.50 gram of pure 6-carbamido-benzoxazolone. The tablets would contain approximately 0.25 gram to about 0.50 gram of pure 6-carbamido-benzoxazolone, a small amount of a lubricant such as magnesium stearate and a disintegrating agent such as cornstarch.

The following examples are given by way of illustration and not of limitation.

EXAMPLE 1

*Preparation of 6-carbamido-benzoxazolone*

To a warm solution of 75 milliliters of 2.5 N hydrochloric acid was added 4.2 grams of 6-aminobenzoxazolone, (which was prepared as set forth herein below). To the suspension thus formed was added 2.43 grams of potassium cyanate in 10 ml. of water. Complete solution was effected and in a few seconds a precipitate of 6-carbamido-benzoxazolone separated from solution. The precipitate was collected and had a melting point of over 340° C. The 6-carbamido-benzoxazolone was recrystallized from 200 milliliters of 50% aqueous ethyl alcohol to yield crystals, melting at over 340° C.

*Analysis.*—Calculated for: $C_8H_7N_3O_3$: C, 49.74; H, 3.65; N, 21.76. Found: C, 49.72; H, 3.69; N, 21.29.

The 6-aminobenzoxazolone utilized as a starting material in this example was prepared as follows:

To 120 milliliters of concentrated nitric acid was added a small portion of 27 grams of benzoxazolone. This mixture was warmed slightly on the steam bath to start the reaction. The remainder of the benzoxazolone was added in portions keeping the temperature about 50° C. The product began to separate before the addition was complete. The reaction mixture was allowed to stand twenty minutes and then was diluted with water. The yellow needles were collected and washed well with water to give 6-nitrobenzoxazolone, melting at 245–247° C.

Ten grams of 6-nitrobenzoxazolone was dissolved in 150 milliliters of boiling 1 N sodium hydroxide forming a dark red solution. To this mixture was added sodium hydrosulfite in portions until the red color disappeared. The mixture was cooled and 6-aminobenzoxazolone was collected. It melted at 199–201° C.

EXAMPLE 2

A tablet containing 6-carbamido-benzoxazolone may be prepared as follows:

| | Grams |
|---|---|
| 6-carbamido-benzoxazolone | 0.25 |
| Magnesium stearate | 0.005 |
| Cornstarch | 0.145 |

The above-mentioned ingredients are thoroughly mixed and pressed into tablets.

Any departure from the above description which conforms to the present invention is intended to be included within the scope of the claims.

We claim:

1. 6-carbamido-benzoxazolone represented by the following structure:

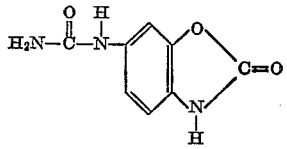

2. The process which comprises reacting 6-aminobenzoxazolone with potassium cyanate in the presence of acid to form 6-carbamido-benzoxazolone.

No references cited.